(12) United States Patent
Kowalczyk et al.

(10) Patent No.: US 10,310,192 B2
(45) Date of Patent: Jun. 4, 2019

(54) FIBER OPTIC CABLE ASSEMBLY

(71) Applicant: CommScope Technologies LLC, Hickory, NC (US)

(72) Inventors: Scott C. Kowalczyk, Savage, MN (US); Cyle D. Petersen, Belle Plaine, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/712,566

(22) Filed: Sep. 22, 2017

(65) Prior Publication Data

US 2018/0081126 A1  Mar. 22, 2018

Related U.S. Application Data

(60) Provisional application No. 62/398,182, filed on Sep. 22, 2016.

(51) Int. Cl.
| | |
|---|---|
| *G02B 6/36* | (2006.01) |
| *G02B 6/38* | (2006.01) |
| *G02B 6/02* | (2006.01) |
| *G02B 6/42* | (2006.01) |

(52) U.S. Cl.
CPC ....... *G02B 6/3877* (2013.01); *G02B 6/02004* (2013.01); *G02B 6/3861* (2013.01); *G02B 6/4285* (2013.01)

(58) Field of Classification Search
CPC .. G02B 6/3861; G02B 6/3885; G02B 6/3887; G02B 6/3839; G02B 6/3869; G02B 6/36
See application file for complete search history.

(56) References Cited

U.S. PATENT DOCUMENTS

| | | | |
|---|---|---|---|
| 5,186,992 A | 2/1993 | Kite, III | |
| 6,341,626 B1 | 1/2002 | Davenport | |
| 6,491,067 B1 | 12/2002 | Davenport | |
| 6,619,697 B2 * | 9/2003 | Griffioen | ............... F16L 41/023 |
| | | | 285/126.1 |
| 8,002,781 B1 | 8/2011 | Dermody, IV | |
| 8,157,820 B1 | 4/2012 | Dermody, IV | |
| (Continued) | | | |

FOREIGN PATENT DOCUMENTS

| | | |
|---|---|---|
| CN | 203445509 U | 2/2014 |
| EP | 0087227 A1 | 8/1983 |
| (Continued) | | |

OTHER PUBLICATIONS

"How to use 76 Tool," Techflex Braided Sleeving Products, www.techflex.com, Accessed Mar. 10, 2016, 1 page.

(Continued)

*Primary Examiner* — Jennifer Doan
(74) *Attorney, Agent, or Firm* — Merchant & Gould P.C.

(57) ABSTRACT

The present disclosure relates to a fiber optic cable arrangement including a plurality of fiber optic cables. At a central section of the fiber optic cable arrangement, the fiber optic cables are arranged in a core and are protected by an outer split sleeve. At end sections of the fiber optic cable arrangement, the fiber optic cables form connectorized pigtails. Transitions form demarcation locations (e.g., fan-out or break-out locations) between the central section and the end sections. The transitions include one or more tape layers and/or one or more heat shrink layers.

9 Claims, 12 Drawing Sheets

(56) References Cited

U.S. PATENT DOCUMENTS

| | | | |
|---|---|---|---|
| 8,205,314 B1 | 6/2012 | Dermody, IV | |
| 8,565,565 B2 | 10/2013 | Barrett et al. | |
| 8,694,069 B1* | 4/2014 | Kosa | A61B 5/1455 264/1.24 |
| 8,801,296 B2 | 9/2014 | LeBlanc et al. | |
| 9,091,002 B2 | 7/2015 | Malloy | |
| 9,093,191 B2* | 7/2015 | Hiel | B32B 15/04 |
| 9,182,567 B2 | 11/2015 | Mullaney | |
| 2003/0168248 A1 | 9/2003 | Savoy | |
| 2006/0280413 A1 | 12/2006 | Paschal et al. | |
| 2009/0294016 A1 | 12/2009 | Sayres et al. | |
| 2011/0188809 A1 | 8/2011 | LeBlanc et al. | |
| 2011/0211793 A1 | 9/2011 | Barrett et al. | |
| 2013/0228248 A1 | 9/2013 | Malloy | |
| 2017/0229217 A1 | 8/2017 | Kowalczyk et al. | |

FOREIGN PATENT DOCUMENTS

| | | |
|---|---|---|
| WO | 2013132710 A1 | 9/2013 |
| WO | 2014085459 A1 | 6/2014 |

OTHER PUBLICATIONS

"How to use Rapid Install Tool," Techflex Braided Sleeving Products, www.techflex.com, Accessed Mar. 10, 2016, 1 page.
"Using the F6 Tool," Techflex Braided Sleeving Solutions, www.techflex.com/tips_f6tool.asp, Accessed Mar. 3, 2016, 3 pages.
Techflex Braided Sleeving Solutions, 2015, 112 pages.

* cited by examiner

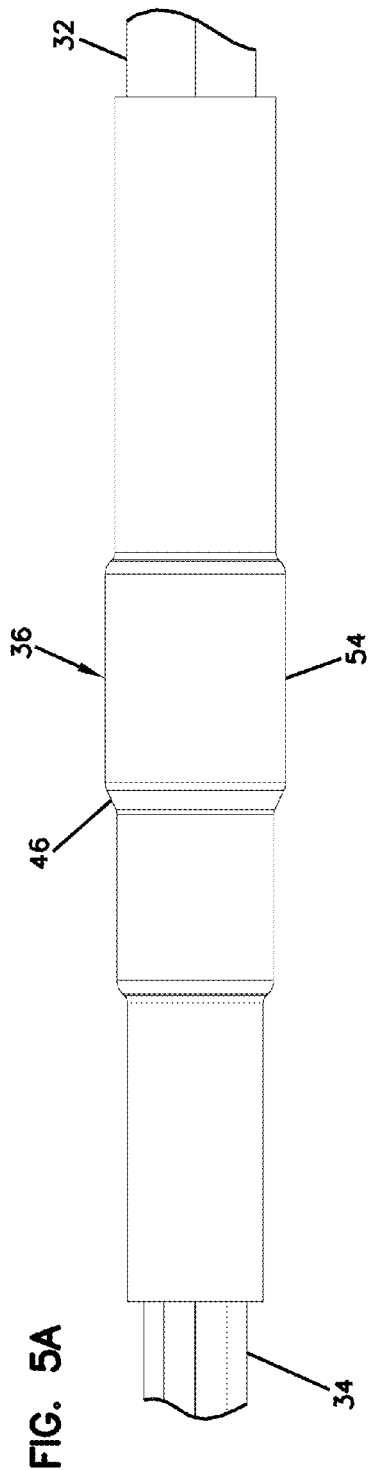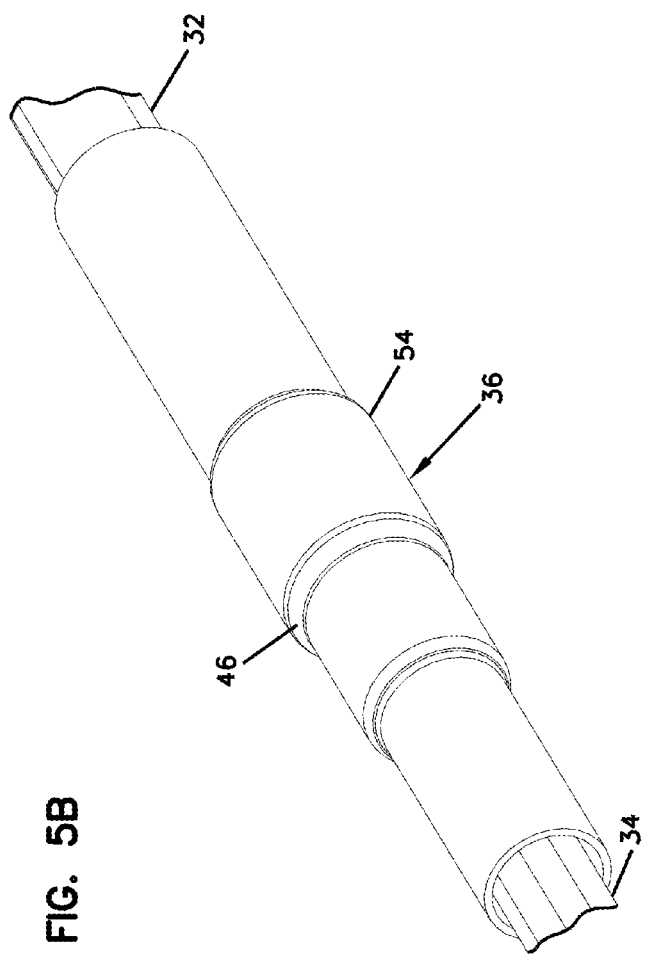
FIG. 5A
FIG. 5B

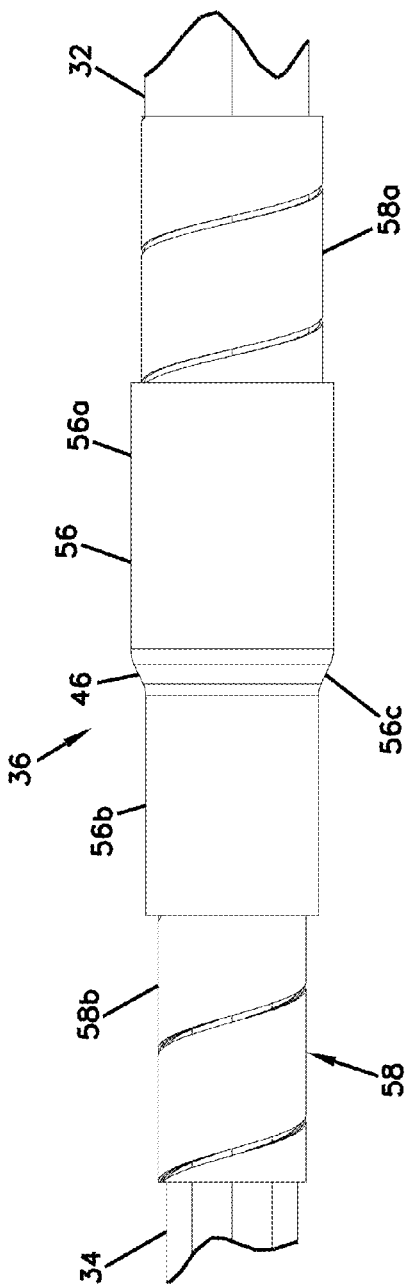
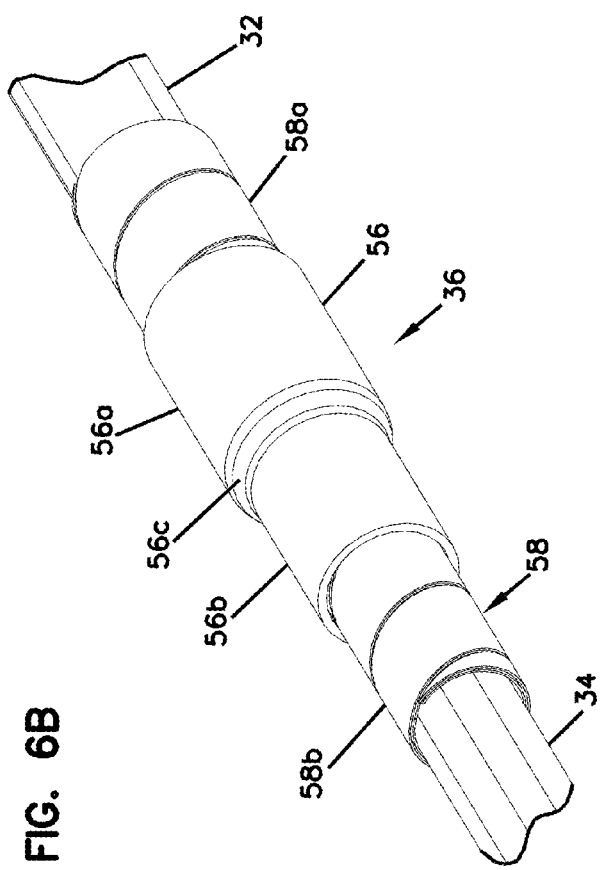
FIG. 6A
FIG. 6B

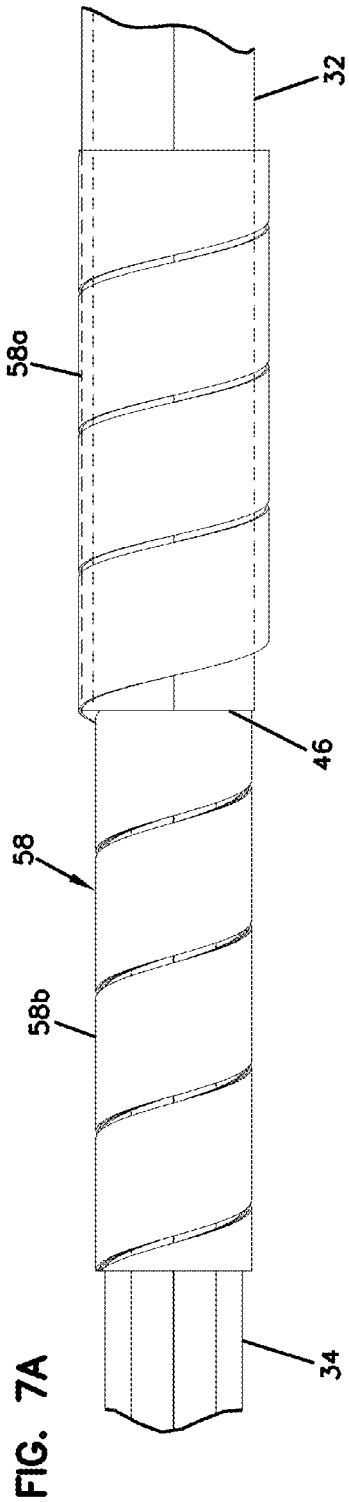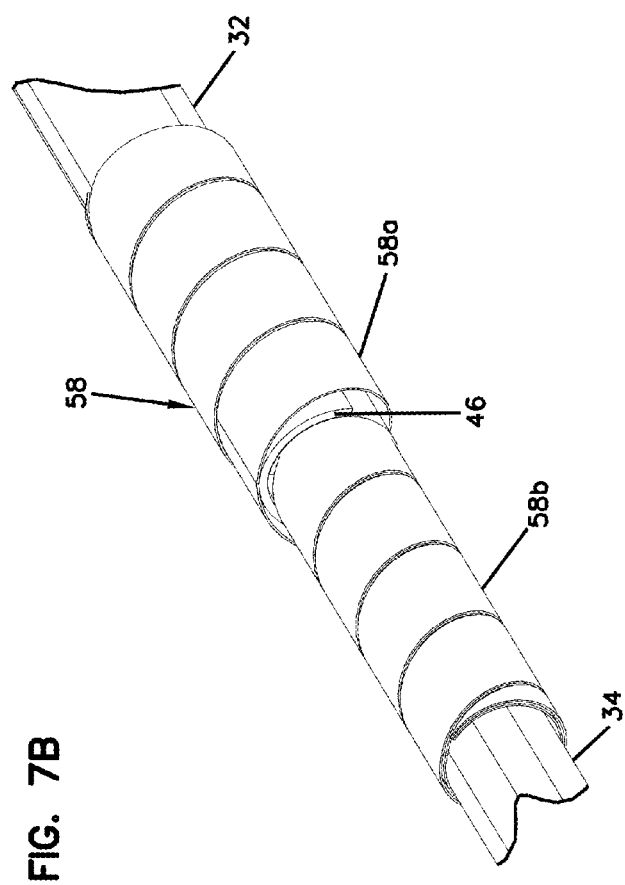
FIG. 7A
FIG. 7B

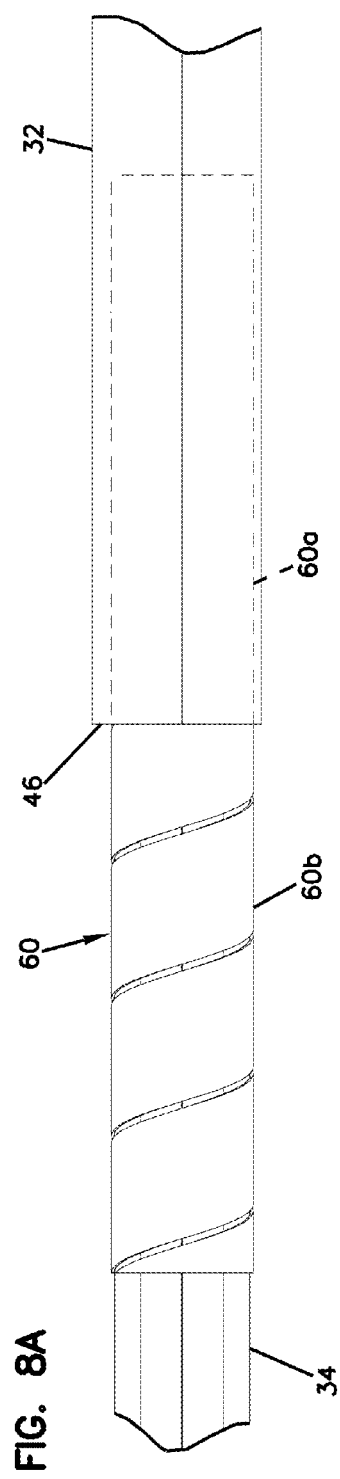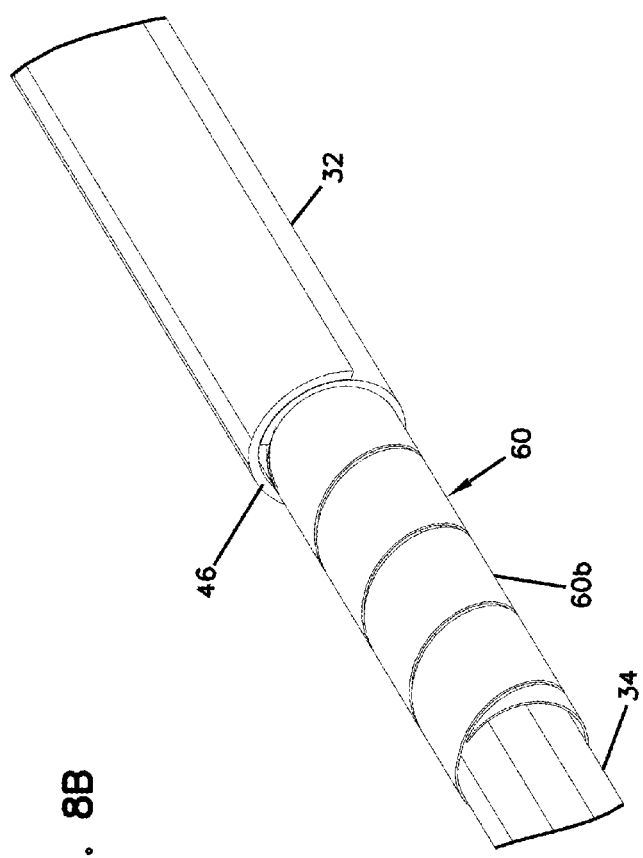
FIG. 8A
FIG. 8B

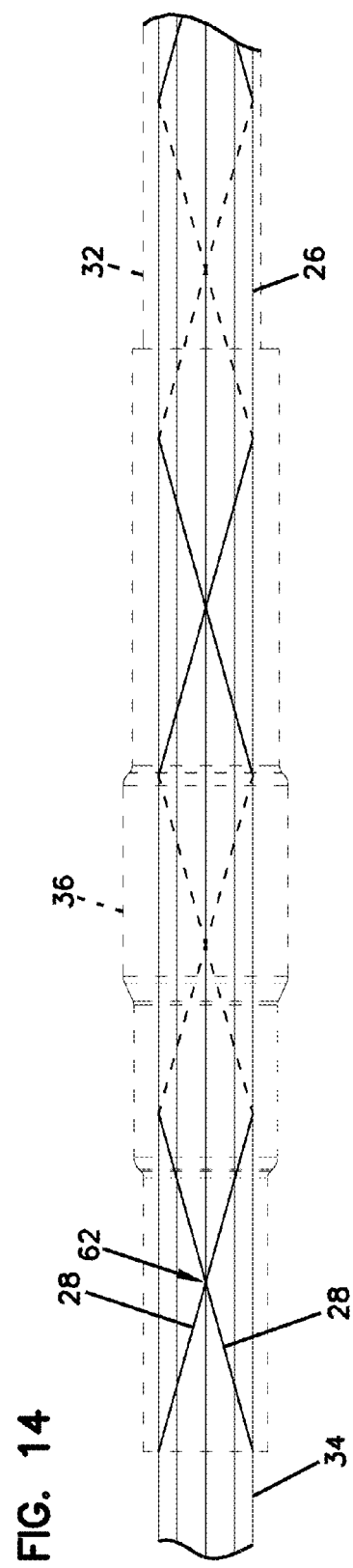

US 10,310,192 B2

FIBER OPTIC CABLE ASSEMBLY

CROSS-REFERENCE TO RELATED APPLICATIONS

This application claims priority to provisional U.S. Patent Application No. 62/398,182 filed Sep. 22, 2016, the disclosure of which is incorporated herein by reference in its entirety.

TECHNICAL FIELD

The present disclosure relates generally to cables and cable assemblies. More particularly, the present disclosure relates to fiber optic cables and fiber optic cable assemblies.

BACKGROUND

Flexible split sleeves are commonly used to protect flexible cables or bundles of cables. For example, flexible split sleeves are used to protect soft or delicate cables from contact wear. Flexible split sleeves can also protect cables from dirt and contaminants. Additionally, flexible split sleeves can be used to provide a more attractive or aesthetically pleasing packaging configuration around a bundle of cables.

SUMMARY

Aspects of the present disclosure relate to transition configurations used at locations where fiber optic cables transition out from flexible split-tubes. In certain examples, the transition configurations can be durable and secure. In certain examples, the transition configurations can be aesthetically pleasing. In certain examples, the transition configurations have minimal profiles so as to not be too bulky.

Other aspects of the present disclosure relate to fiber optic cable assemblies having a plurality of fiber optic cables. The fiber optic cables include central regions arranged in a core that is protected by a flexible split sleeve. Portions of the fiber optic cables extend outwardly from the ends of the flexible split sleeve so as to form fiber optic pigtails. The fiber optic pigtails can be connectorized. Transition arrangements can be provided at the ends of the flexible split sleeve for securing the split sleeve to the fiber optic cables. The split sleeve preferably is flexible such that the full assembly can be readily routed through narrow passages and along curved pathways. The transitions can have relatively small profiles so as to not substantially increase the maximum cross-sectional areas of the cable assembly. The transitions can each have a smooth configuration that does not readily interfere with the ability to route the cable assembly along desired pathways. In certain examples, the transitions can also secure binding elements to the cables. Additionally, the transitions can function as breakout or fan-out locations where the fiber optic cables transition from a bundled, core configuration to individual pigtails. The combination of the split sleeve and the transitions can provide an aesthetically pleasing and sleek appearance of the fiber optic cable assembly.

Another aspect of the present disclosure relates to a fiber optic cable assembly including a split sleeve having a first end and an opposite second end. The split sleeve includes a split that extends continuously along a length of the split sleeve from the first end to the second end. The fiber optic cable assembly also includes a plurality of fiber optic cables arranged in a cable core protected within the split sleeve. Each of the fiber optic cables includes at least one optical fiber and a tensile reinforcing structure enclosed within a cable jacket. The fiber optic cable assembly also includes binding elements wrapped contra-helically around the cable core. The binding elements are positioned within the split sleeve and also include end portions that extend outwardly beyond the first and second ends of the split sleeve. The fiber optic cables includes sets of separately movable pigtails that extend outwardly from each of the end portions of the binding elements. The pigtails are preferably unbound and individually movable relative to one another. The pigtails have connectorized ends. The fiber optic cable assembly further includes a first transition and a second transition where the fiber optic cable assembly transitions from the cable core to the sets of pigtails. The first and second transitions are positioned respectively at the first and second ends of the split sleeve. The transitions include first tape layers positioned over the end portions of the binding elements for securing the end portions of the binding elements to the fiber optic cables. The transitions also include first heat shrink layers positioned over the first and second ends of the split sleeve. The first heat shrink layers of the transitions also extend outwardly from the first and second ends of the split sleeve so as to cover at least portions of the first tape layers that extend outwardly beyond the first and second ends of the split sleeve.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 5A is a side view of a transition of the fiber optic cable assembly of FIG. 1;

FIG. 5B is a perspective view of the transition of FIG. 5A;

FIG. 6A is a side view of the transition of FIG. 5A with an outer heat-shrink layer removed;

FIG. 6B is a perspective view of the transition of FIG. 5B with the outer heat-shrink layer removed;

FIG. 7A is a side view of the transition of FIG. 6A with an inner heat-shrink layer removed;

FIG. 7B is a perspective view of the transition of FIG. 6B with the inner heat-shrink layer removed;

FIG. 8A is a side view of the transition of FIG. 7A with an outer tape layer removed;

FIG. 8B is a perspective view of the transition of FIG. 7B with the outer tape layer removed;

FIG. 14 shows a portion of the fiber optic cable assembly of FIG. 1 with one of the transitions shown in phantom lines and a contra-helical arrangement of the binding elements depicted.

DETAILED DESCRIPTION

Figure 1:
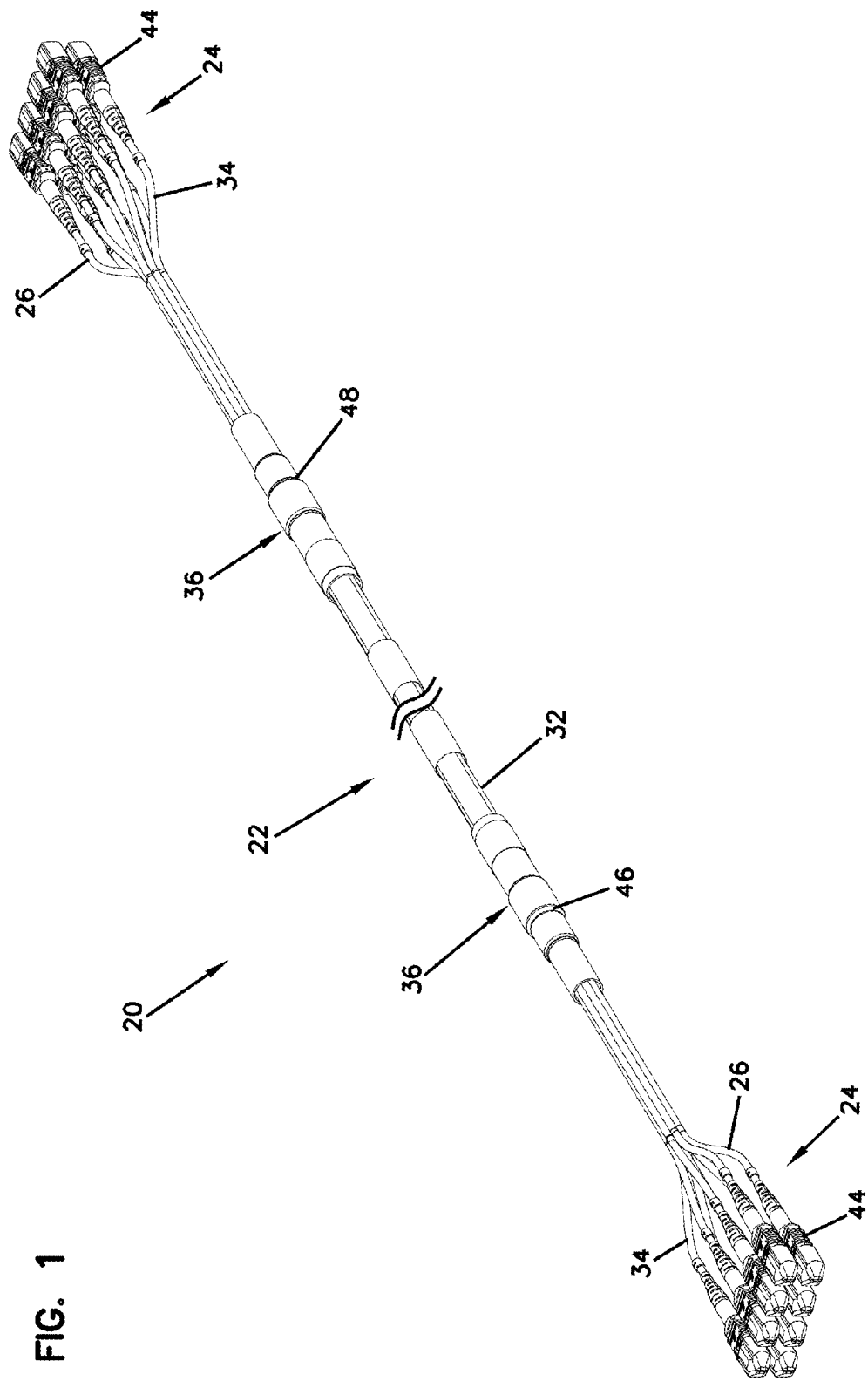
FIG. 1 is a perspective view of a fiber optic cable assembly in accordance with the principles of the present disclosures.
Figure 2:
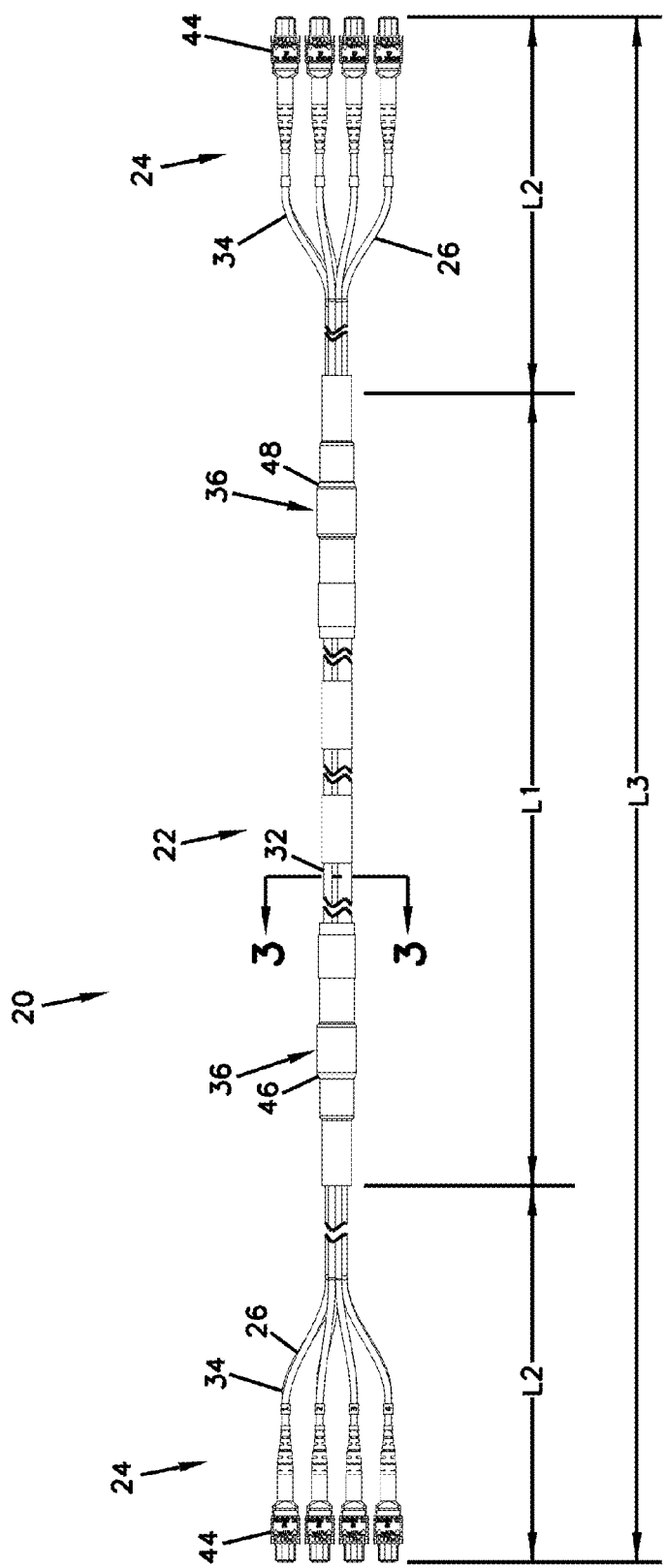
FIG. 2 is a plan view of the fiber optic cable assembly of FIG. 1.
Figure 3:
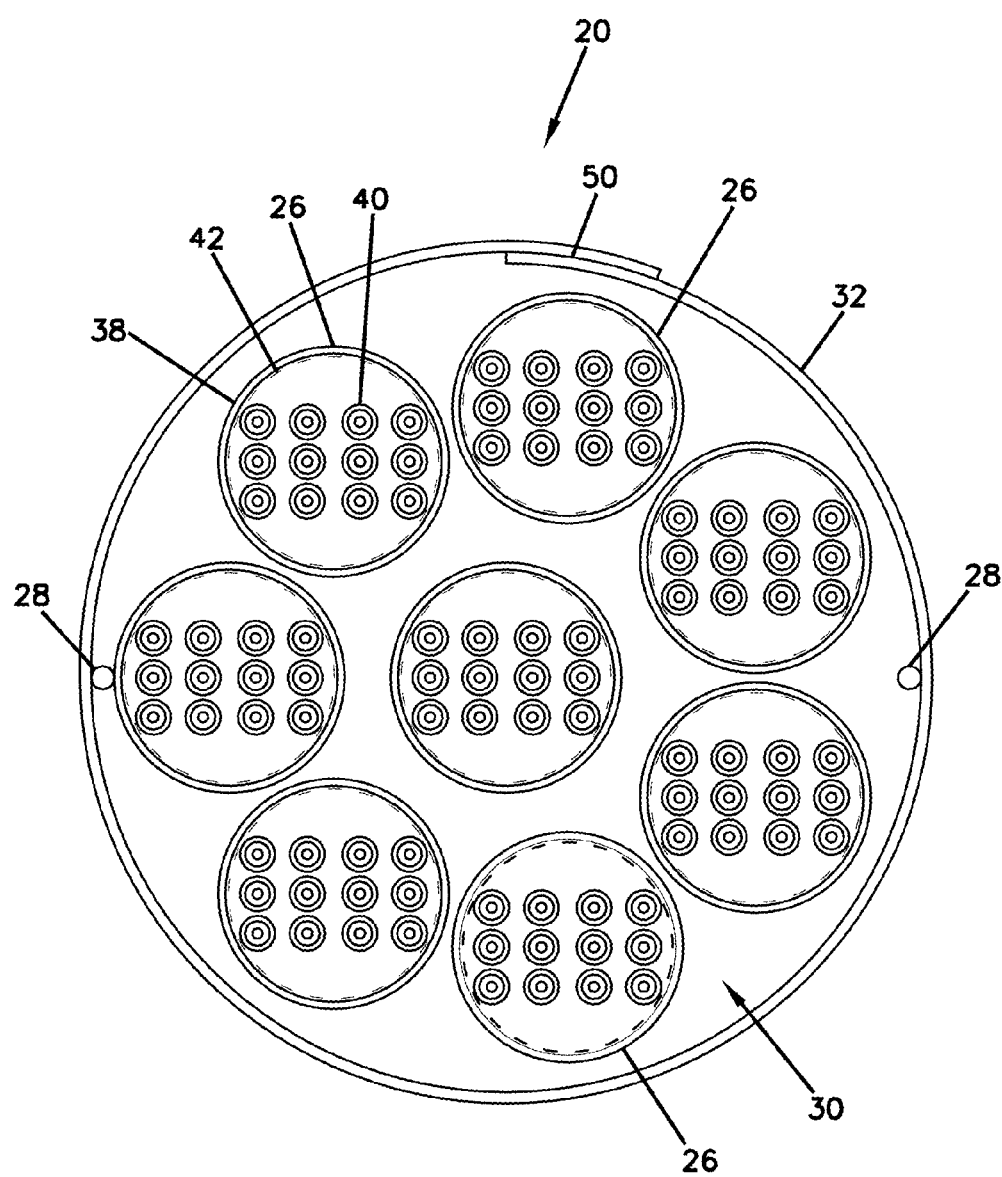
FIG. 3 is a cross-sectional view taken along section line 3-3 of FIG. 2.

FIGS. 1 and 2 depict a fiber optic cable assembly 20 in accordance with the principles of the present disclosure. The fiber optic cable assembly 20 includes a central section 22 and opposite end sections 24. The central section 22 has a length L1 and the end sections 24 have lengths L2. Typically, the length L1 is typically substantially longer than the lengths L2. The fiber optic cable assembly 20 includes a plurality of separate fiber optic cables 26 that extend generally along an entire length L3 of the fiber optic cable assembly 20. At the central section 22 of the fiber optic cable assembly 20, the fiber optic cables 26 are arranged in a bundled configuration and can be bundled together by binding elements 28. As shown at FIG. 3, the binding elements 28 can hold the fiber optic cables 26 together such that the cables form a cable core 30. In certain examples, within the cable core 30 the fiber optic cables 26 can be stranded (e.g., in an SZ strand pattern) to enhance the overall flexibility of the cable core 30. A vast majority of the cable core 30 is preferably protected within an outer split sleeve 32. In certain examples, the split sleeve 32 can coincide with the entire cable core 30. The fiber optic cables 26 form fiber optic pigtails 34 at the end sections 24 of the fiber optic cable assembly 20. The fiber optic pigtails 34 are preferably not bound together and preferably can be individually movable relative to one another. The fiber optic pigtails are preferably connectorized. The fiber optic cable assembly 20 can also include transitions 36 which generally serve as demarcation locations between the cable core 30 and the fiber optic pigtails 34. The transitions 36 can include multiple layers (e.g., one or more tape layers and/or one or more heat-shrink layers) that couple the binding elements 28 and the split sleeve 32 to the fiber optic cables 26.

It will be appreciated that the lengths L2 are typically in the range of about 3-6 feet. However, other lengths can also be used. Additionally, the length L1 is typically substantially longer than the lengths L2. In certain examples, the length L1 is at least 8 feet. In certain examples, the length L1 is at least 25 feet, or 50 feet, 100 feet, or 200 feet, 500 feet, or 1,000 feet. In certain examples, fiber optic cable assembly 20 is configured to have a relatively low profile and to be extremely flexible. This type of configuration allows the fiber optic cable assembly 20 to be routed along narrow paths and through curved conduits. In certain examples, a pulling sock or pulling sleeve can be mounted over one of the end sections 24 and used to pull the fiber optic cable assembly 20 along a desired routing path. In certain examples, the transitions 36 have relatively small profiles so as to not interfere with the ability of the fiber optic cable assembly 20 to be routed through relatively narrow passages.

Referring to FIG. 3, each of the fiber optic cables 26 includes a jacket 38 containing at least one optical fiber 40. The jacket 38 can also contain a tensile reinforcing structure 42. The tensile reinforcing structure 42 can include a flexible structure such as a yarn (e.g. an aramid yarn), strand, tape or other reinforcing layer or reinforcing member.

Preferably, a plurality of the optical fibers 40 are provided within each of the jackets 38. In certain examples, each of the fiber optic cables 26 includes at least two, four, eight, twelve, sixteen, twenty-four, thirty-six or more optical fibers.

In preferred examples, the fiber optic pigtails 34 are terminated by fiber optic connectors. As depicted, the fiber optic connectors include multi-fiber fiber optic connectors 44 such as MPO connectors. In the depicted example, each of the multi-fiber fiber optic connectors 44 accommodates twelve optical fibers. In other examples, multi-fiber fiber optic connectors for accommodating two, four, eight, twelve, sixteen, twenty-four, thirty-six or more optical fibers can be used. In other examples, single-fiber fiber optic connectors can be used.

The split sleeve 32 of the fiber optic cable assembly 20 has a first end 46 positioned at one of the transitions 36 and second end 48 positioned at the other transition 36. The split sleeve 32 includes a longitudinal slit, split or seam 50 (shown in FIG. 3) that extends continuously along a length of the split sleeve 32 from the first end 46 to the second end 48. The seam 50 allows the split sleeve 32 to be flexed open to access the fiber optic cables 26 contained therein. Preferably, a split sleeve 32 has a construction with inherent elasticity that biases the split sleeve 32 from the flexed-open position back toward a closed position (the closed position is shown at FIG. 3). In certain examples, the split sleeve 32 can have a corrugated plastic configuration. In other examples, the split sleeve 32 can be made of a textile material. In certain examples, the split sleeve 32 can include a braided sleeve formed by interwoven plastic or fiberglass strands that form a highly flexible mesh tube or braided tube. Example split-sleeves are disclosed by U.S. Pat. Nos. 5,186,992; 6,491,067; 8,002,781; and 9,091,002; and 6,341,626, which are hereby incorporated by reference in their entireties. Further split sleeves disclosed by U.S. Patent Publication Nos. US 2013/0228248 and US 2003/0168248, which are hereby incorporated by reference in their entireties. An example of a tool that can be used to install a split sleeve over a bundle of fiber optic cables is disclosed in U.S. Patent Publication No. 2017/0229217 which is incorporated herein by reference in its entirety.

Figure 4:
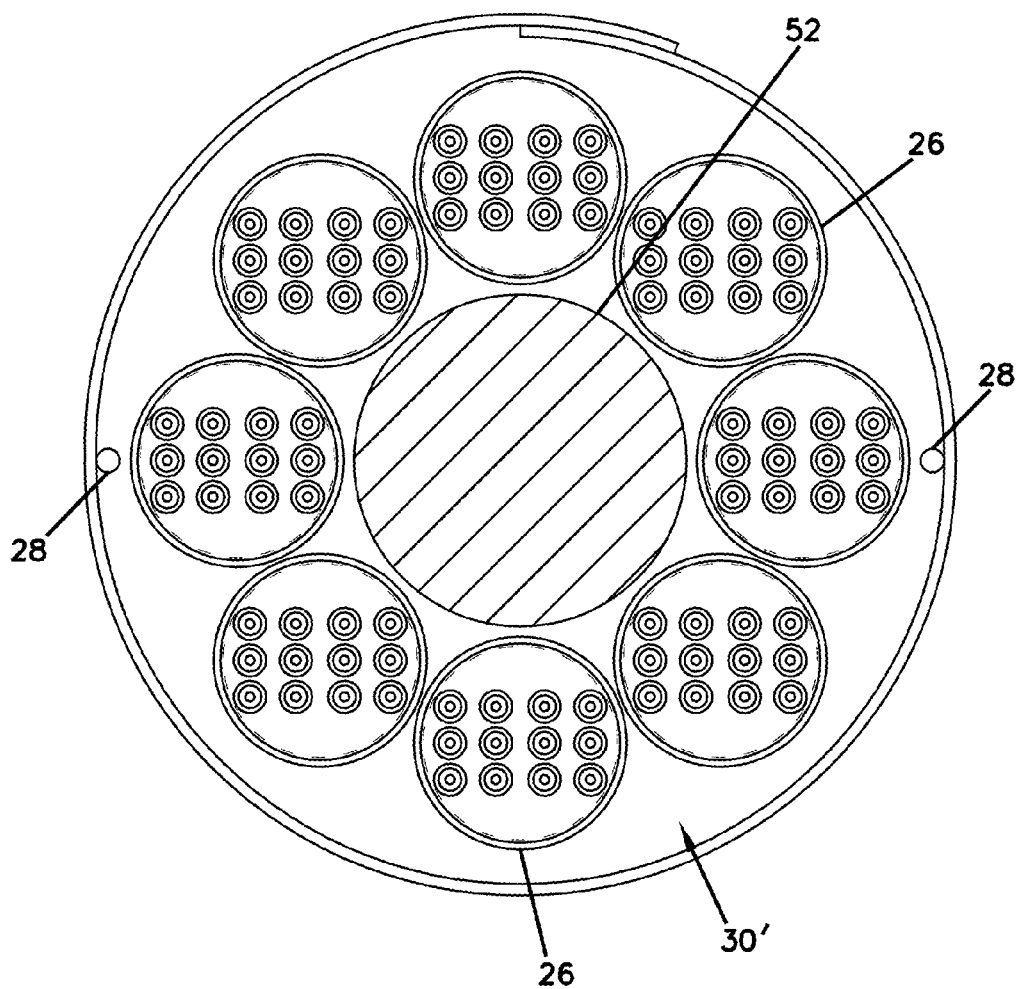
FIG. 4 is a cross-sectional view showing an alternative cable core arrangement that can be used in accordance with the principles of the present disclosure.

The cable core 30 of FIG. 3 does not include any additional strength elements other than those provided within the fiber optic cables 26 themselves. FIG. 4 shows an alternative core configuration 30' where the fiber optic cables 26 are positioned and stranded about a central strength member 52. It will be appreciated that the cross-sectional view of FIG. 4 is not necessarily to scale and is more diagrammatic in nature.

The cable core 30 is depicted including 96 optical fibers. It will be appreciated that different cable core arrangements, different numbers of fiber optic cables, and different fiber counts per fiber optic cable can be used. In certain examples, cable cores having 72 fibers, 96 fibers, 108 fibers, 144 fibers, 192 fibers, 216 fibers, and/or 288 fibers can be used. It will be appreciated that other fiber counts can also be used.

It will be appreciated that the binding elements 28 of the fiber optic cable assembly 20 can include threads (e.g., polymeric threads such as nylon threads), strings, filaments (e.g., monofilaments such as polymeric monofilaments), strands, yarns (e.g., aramid yarn), tapes, twines, or other similar structures that can be wrapped around a cable core in a helical manner. As depicted at FIG. 14, the binding elements 28 include two separate binding elements 28 that are wrapped in opposite spiral (i.e., helical) directions about the cable core 30 so as to help bundle the fiber optic cables 26 together. The binding elements 28 are positioned within the split sleeve 32 such that the cable core 30 and the binding elements 28 are protected by the split sleeve 32. One of the binding elements 28 spirals in a clockwise direction around the cable core 30 and the other of the binding elements 28 spirals in a counterclockwise direction about the cable core 30. Preferably, the binding elements 28 extend for the entire length L1 or almost the entire length L1 and are secured to the fiber optic cables 26 at the transitions 36.

FIGS. 5A and 5B show one of the transitions 36. The transition 36 of FIGS. 5A and 5B includes an outer heat-shrink layer 54. As used herein, the "heat-shrink layer" is a layer having shape-memory characteristics such that when heat is applied to the layer, the layer shrinks to a smaller size. In certain examples, the outer heat-shrink layer 54 does not include an inner adhesive layer.

FIGS. 6A and 6B show the transition 36 of FIGS. 5A and 5B with the outer heat-shrink layer 54 removed. As shown at FIGS. 6A and 6B the transition 36 includes an inner heat-shrink layer 56 that is positioned over the first end 46 of the split sleeve 32. The inner heat-shrink layer 56 includes a first portion 56a that extends over the split sleeve 32 and a second portion 56b that extends outwardly beyond the first end 46 of the split sleeve 32. The inner heat-shrink layer 56 includes a diameter transition 56c between the first and second portions 56a and 56b. The second portion 56b has a smaller diameter than portion 56a. The inner heat-shrink layer 56 preferably includes an inner layer of adhesive that can be heat activated.

FIGS. 7A and 7B show the transition 36 of FIGS. 6A and 6B with the inner heat-shrink layer 56 removed. As shown at FIGS. 7A and 7B, the transition 36 includes an outer tape layer 58 that extends over the first end 46 of the split sleeve 32. The outer tape layer 58 can be spirally wrapped around the fiber optic cables 26 and the split sleeve 32. The outer tape layer 58 can include a first portion 58a wrapped about the exterior of the split sleeve 32 adjacent the first end 46 and a second portion 58b that extends outwardly beyond the first end 46 of the split sleeve 32. In certain examples, the outer tape layer 58 includes a strip of tape including a stretchable substrate having adhesive applied thereon. In certain examples, the outer tape layer 58 can include electrical tape.

FIGS. 8A and 8B show the transition 36 of FIGS. 7A and 7B with the outer tape layer 58 removed. Shown at FIGS. 8A and 8B, the transition 36 includes an inner tape layer 60 that is spirally wrapped about the fiber optic cables 26. The inner tape layer 60 can include a first portion 60a that extends beneath the split sleeve 32 and a second portion 60b extends outwardly beyond the first end 46 of the split sleeve 32. In certain examples, the inner tape layer 60 can include a strip of tape having a stretchable substrate with adhesive thereon (e.g., electrical tape). In certain examples, the inner tape layer 60 can function to secure an end portion 62 of the binding elements 28 to the fiber optic cables 26. In this way, the inner tape layer 60 can prevent the binding elements 28 from unraveling beneath the split sleeve 32. It will be appreciated that the binding elements 28 can be trimmed beyond the transition 36 so as to not coincide with the fiber optic pigtails 34.

Referring back to FIGS. 7A and 7B, the outer tape layer 58 is wrapped over and covers the second portion 60b of the inner tape layer and also is wrapped around and covers an end portion of the split sleeve 32. Referring back to FIGS. 6A and 6B, the inner heat-shrink layer 56 is shorter than the outer tape layer 58 and covers a central region of the outer tape layer 58 and is generally centered relative to the first end 46 of the split sleeve 32. Referring back to FIGS. 5A and 5B, the outer heat-shrink layer 54 is long enough to cover all the underlying tape and heat-shrink layers and provides the transition 36 with a finished, aesthetically pleasing appearance.

It will be appreciated that the transitions 36 at opposite ends of the fiber optic cable assembly 20 have the same construction and are assembled in the same way. FIGS. 9-13 depict a sequence of steps for installing the transition 36 at the first end 46 of the split sleeve 32. It will be appreciated that the transition 36 at the second end 48 of the split sleeve 32 can be assembled in the same manner.

Figure 9:
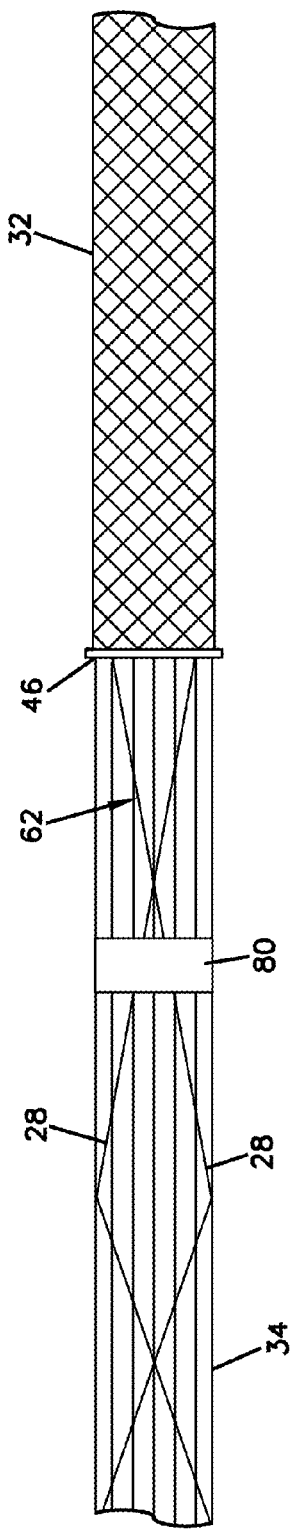
FIG. 9 shows a portion of the fiber optic cable assembly of FIG. 1 prior to installation of one of the transitions.
Figure 10:
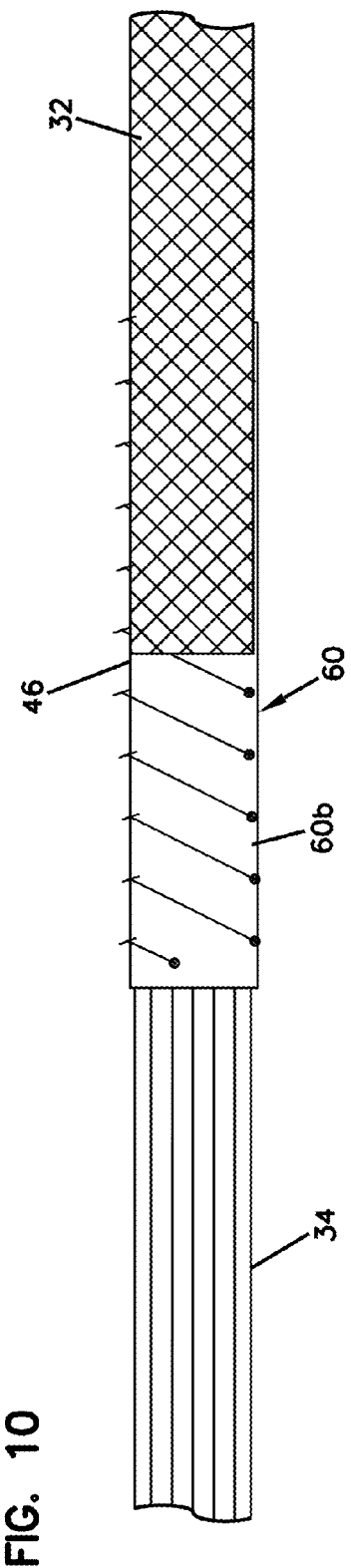
FIG. 10 shows the fiber optic cable assembly of FIG. 9 with binding elements trimmed away from pigtails of the fiber optic cable assembly and a first tape layer wrapped spirally around the cable to secure the binding elements to the cable.

Referring to FIG. 9, a tape marker 80 is initially placed over the binding elements 28 at a location outwardly offset from the first end 46 of the split sleeve 32. The portions of the binding elements 28 extending outwardly beyond the tape marker 80 are then trimmed as shown at FIG. 10. As shown at FIG. 9, end portions 62 of the binding element 28 extend outwardly beyond the first end 46 of the split sleeve. A shown at FIG. 10, the inner tape layer 60 is spirally wrapped around the fiber optic cables 26 such that the end portions 62 of the binding elements 28 are secured to the fiber optic cables 26. During wrapping, the split sleeve 32 can be slightly displaced to allow the first portion 60a of the inner tape layer to be wrapped beneath the split sleeve 32. After the inner tape layer 60 has been applied about the fiber optic cables 26, the split sleeve 32 can be moved back into place so that the first portion 60a of the inner tape layer 60 is positioned underneath the end portion of the split sleeve 32.

Figure 11:
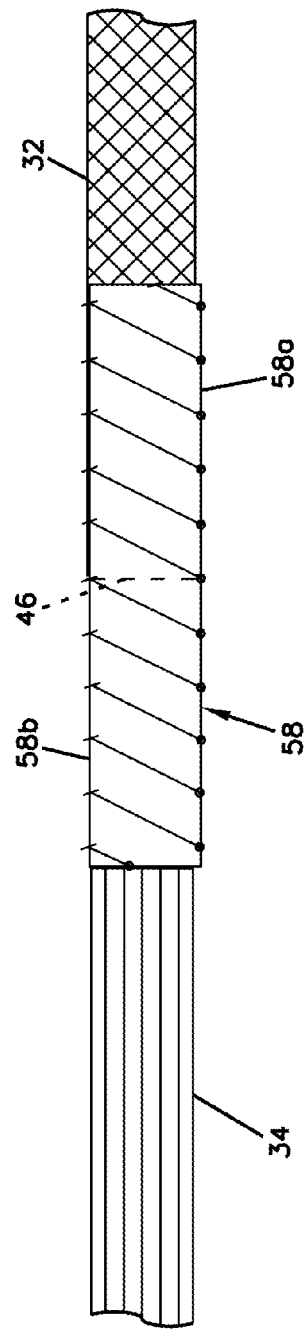
FIG. 11 shows the fiber optic cable assembly of FIG. 10 with a second tape layer spirally wrapped over the first tape layer and over an end of the split sleeve.
Figure 12:
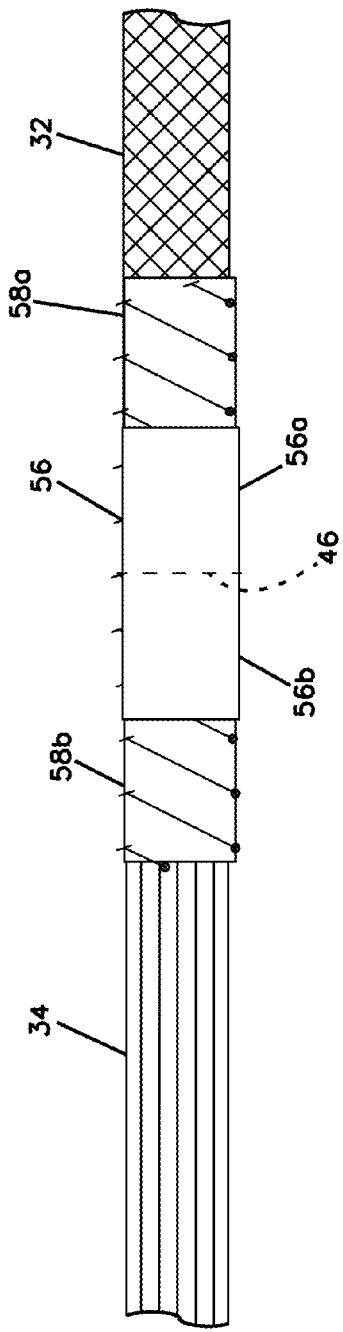
FIG. 12 shows the fiber optic cable assembly of FIG. 11 with an adhesive heat-shrink layer positioned over the second tape layer at the end of the split sleeve.
Figure 13:
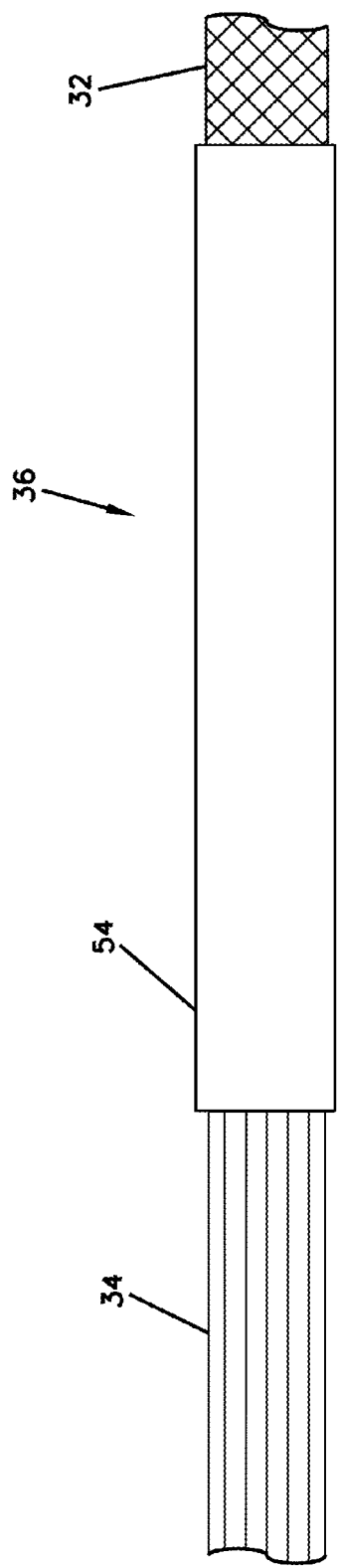
FIG. 13 shows an outer non-adhesive heat-shrink layer positioned over all of the underlying layers of the transition.

Once the tape layer 60 has been applied and the first end 46 of the split sleeve repositioned, the outer tape layer 58 can be spirally wrapped about the exterior of the second portion 60b of the inner tape layer 60 and about the exterior of the end portion of the split sleeve 32 (see FIG. 11). Thereafter, the inner heat-shrink layer 56 can be applied over the outer tape layer 58 at a location coinciding with the first end 46 of the split sleeve 32 (see FIG. 12). Finally, the outer heat-shrink layer 54 can be applied over all the underlying layers so as complete the assembly of the transition 36 (see FIG. 13).

Various examples will be described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein.

What is claimed is:
1. A fiber optic cable assembly comprising:
 a split sleeve having a first end and an opposite second end, the split sleeve including a split that extends continuously along a length of the split sleeve from the first end to the second end;
 a plurality of fiber optic cables arranged in a cable core protected within the split sleeve, each of the fiber optic cables including at least one optical fiber and a tensile reinforcing structure enclosed within a cable jacket;

binding elements wrapped contra-helically around the cable core, the binding elements being positioned within the split sleeve, the binding elements including end portions that extend outwardly beyond the first and second ends of the split sleeve and;

the fiber optic cables including sets of separately moveable pigtails that extend outwardly from each of the end portions of the binding elements, the pigtails having connectorized ends; and a first transition and second transition where the fiber optic cable assembly transitions from the core to the sets of pigtails, the first and second transitions being positioned respectively at the first and second ends of the split sleeve, the transitions including first tape layers positioned over the end portions of the binding elements for securing the end portions of the binding elements to the fiber optic cables, the transitions also including first heat shrink layers positioned over the first and second ends of the split sleeve and also extending outwardly from the first and second ends of the split sleeve so as to cover at least portions of the first tape layers that extend outwardly beyond the first and second ends of the split sleeve.

2. The fiber optic cable assembly of claim 1, wherein the first tape layers include first sections positioned over the end portions of the binding elements that are positioned outwardly beyond the first and second ends of the split sleeve, and second sections that extend beneath the split sleeve.

3. The fiber optic cable assembly of claim 2, wherein the first tape layers are formed by adhesive tape that is spirally wrapped about the binding elements and the cable core.

4. The fiber optic cable assembly of claim 2, wherein the first and second transitions include second tape layers that extend over the first sections of the first tape layers and that also extend over first and second end portions of the split sleeve, and wherein the first heat shrink layers are positioned over the second tape layers.

5. The fiber optic cable assembly of claim 4, wherein the first heat shrink layers are adhesive heat shrink layers that only partially cover the second tape layers, and wherein the first and second transitions also include second heat shrink layers that fully cover the first heat shrink layers and also fully cover the second tape layers, the second heat shrink layer being a non-adhesive heat shrink layer.

6. The fiber optic cable assembly of claim 1, wherein the tensile reinforcing structure includes aramid yarn.

7. The fiber optic cable assembly of claim 1, wherein each of the fiber optic cables includes a plurality of optical fibers, and wherein the connectorized ends of the pigtails include multi-fiber connectors.

8. The fiber optic cable assembly of claim 1, wherein the fiber optic cables are stranded within the cable core.

9. The fiber optic cable assembly of claim 8, where in the fiber optic cables are SZ stranded within the cable core.

* * * * *